United States Patent
Idei et al.

(10) Patent No.: US 7,055,323 B2
(45) Date of Patent: Jun. 6, 2006

(54) OIL PRESSURE GENERATOR FOR A VEHICLE

(75) Inventors: Shoji Idei, Kakogawa (JP); Seiichi Ino, Kakogawa (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 8 days.

(21) Appl. No.: 10/936,847

(22) Filed: Sep. 8, 2004

(65) Prior Publication Data
US 2005/0056011 A1   Mar. 17, 2005

(30) Foreign Application Priority Data
Sep. 12, 2003  (JP)  ............................ 2003-321685

(51) Int. Cl.
*B60T 7/02*  (2006.01)
(52) U.S. Cl. .......................................... 60/594; 60/550
(58) Field of Classification Search .................. 60/533, 60/550, 594; 188/344, 359
See application file for complete search history.

(56) References Cited

U.S. PATENT DOCUMENTS 2,271,273 A * 1/1942 Mueller ..................... 188/344
6,502,675 B1 * 1/2003 Andrus ...................... 188/344

FOREIGN PATENT DOCUMENTS

JP  09-058557  3/1997

* cited by examiner

*Primary Examiner*—Thomas E. Lazo
(74) *Attorney, Agent, or Firm*—Alleman Hall McCoy Russell & Tuttle LLP

(57) ABSTRACT

An oil pressure generator for a vehicle is disclosed, including a bar-shaped steering handle having a pipe structure, a lever pivotally mounted in the vicinity of an end portion of the handle, and a master cylinder for a hydraulic brake or a hydraulic clutch, the master cylinder being configured to house a piston movable according to an operation of the lever, wherein the master cylinder is located within the handle.

11 Claims, 3 Drawing Sheets

OIL PRESSURE GENERATOR FOR A VEHICLE

BACKGROUND OF THE INVENTION

1. Field of the Invention

The present invention relates to an oil pressure generator for a vehicle such as a motorcycle equipped with a brake lever or a clutch lever in the vicinity of a grip provided on a steering bar handle. More particularly, the present invention relates to an oil pressure generator provided on a handle and configured to operate a hydraulic brake or a hydraulic clutch.

2. Description of the Related Art

A motorcycle is typically equipped with a front wheel which is a steering wheel mounted at a lower portion of a front fork and a rear wheel which is a drive wheel driven by an engine mounted in the motorcycle. The front wheel is rotatably mounted on the front fork provided with a bar handle on an upper portion thereof, and both end portions of the handle form right and left handle grips. A brake device is disposed in the vicinity of the left handle grip, and a clutch device is disposed in the vicinity of the right handle grip.

Conventionally, various hydraulic brake devices have been employed as brake devices for motorcycles. For example, Japanese Laid-Open Patent Application Publication No. H09-58557 discloses a hydraulic brake device. This hydraulic brake device includes an oil pressure generator externally attached to a handle of a motorcycle, and a disc-shaped or drum-shaped hydraulic brake equipped in the vicinity of an axle of a front wheel. The oil pressure generator and the hydraulic brake are connected to each other through a hydraulic hose filled with brake oil.

The oil pressure generator is provided with a master cylinder. A brake lever operated by a rider is mounted to the master cylinder to be pivotable around a base end portion thereof. The master cylinder is substantially tubular, and contains a piston therein. The piston is movable according to an operation of the brake lever performed by the rider. A rubber boot is provided between an outer peripheral surface of the piston and an inner peripheral surface of the master cylinder to seal the master cylinder, thereby inhibiting dust or the like from entering the master cylinder.

As stated above, the conventional oil pressure generator is externally attached to the handle and hence exposed to outside. So, the master cylinder tends to be subjected to dust, rain or wind. Since dust or the like may enter the master cylinder regardless of the presence of the rubber boot, it is desirable to appropriately inhibit such entry of dust or the like. In addition, it is desirable to achieve a lightweight feeling handle by using a lightweight master cylinder that enables a rider to easily operate the handle. Furthermore, it is desirable to provide a vehicle with improved external appearance by lessening exposure of an oil pressure generator to the outside.

SUMMARY OF THE INVENTION

The present invention addresses the above described condition, and an object of the present invention is to provide an oil pressure generator for a vehicle, capable of inhibiting entry of dust or the like into a master cylinder, of achieving a lightweight master cylinder, and of improving an external appearance of the vehicle.

According to the present invention, there is provided an oil pressure generator for a vehicle, comprising a bar-shaped steering handle having a pipe structure, a lever pivotally mounted in the vicinity of an end portion of the handle, and a master cylinder for a hydraulic brake or a hydraulic clutch, the master cylinder being configured to house a piston movable according to an operation of the lever, wherein the master cylinder is located within the handle. In such a construction, since the master cylinder is located within the handle, and hence is not substantially exposed to the outside, entry of dust, and degradation due to exposure to wind, rain, or ultraviolet rays can be inhibited. In addition, an external appearance of the vehicle is improved. Further, the handle and its vicinity can be designed more freely.

The end portion of the handle may be inserted into a substantially tubular grip configured to be gripped by the rider, and the master cylinder may be located within a portion of the handle which is located within the grip. In such a construction, the effect of an impact externally applied to the master cylinder can be alleviated.

The master cylinder may be tubular and integrated into the handle. In such a construction, reduction of the number of parts and lightweight of the vehicle can be achieved.

The oil pressure generator may further comprise a rod, one end portion of which is attached to the lever to allow the rod to be pivotable around the one end portion, and an opposite end portion of which is configured to contact the piston, wherein the master cylinder includes a tubular cylinder portion that houses the piston, and a tubular rod storage portion located closer to the end portion of the handle than the cylinder portion and which is configured to house the rod. In such a construction, it is possible to inhibit entry of dust into the cylinder portion more appropriately.

A seal member may be provided between an outer peripheral surface of the rod and an inner peripheral surface of the rod storage portion, and configured to seal the cylinder portion. In such a construction, it is possible to inhibit entry of dust into the cylinder portion more reliably.

The oil pressure generator may further comprise a hydraulic hose configured to connect the hydraulic brake or the hydraulic clutch to the cylinder portion of the master cylinder, the hydraulic hose being filled with oil, wherein the hydraulic hose may extend through an inside of the handle. In such a construction, the extent to which a portion of the hydraulic hose is exposed to the outside can be lessened. In addition, external appearance of the handle is simplified.

The oil pressure generator may further comprise a reservoir tank configured to store oil, and an oil hose configured to connect the reservoir tank to the master cylinder, wherein the oil hose may extend through an inside of the handle. In such a construction, the extent to which a portion of the oil hose is exposed to the outside can be lessened. In addition, external appearance of the handle is simplified.

The above and further objects and features of the invention will be more fully be apparent from the following detailed description with accompanying drawings.

DETAILED DESCRIPTION OF THE PREFERRED EMBODIMENTS

Figure 1:
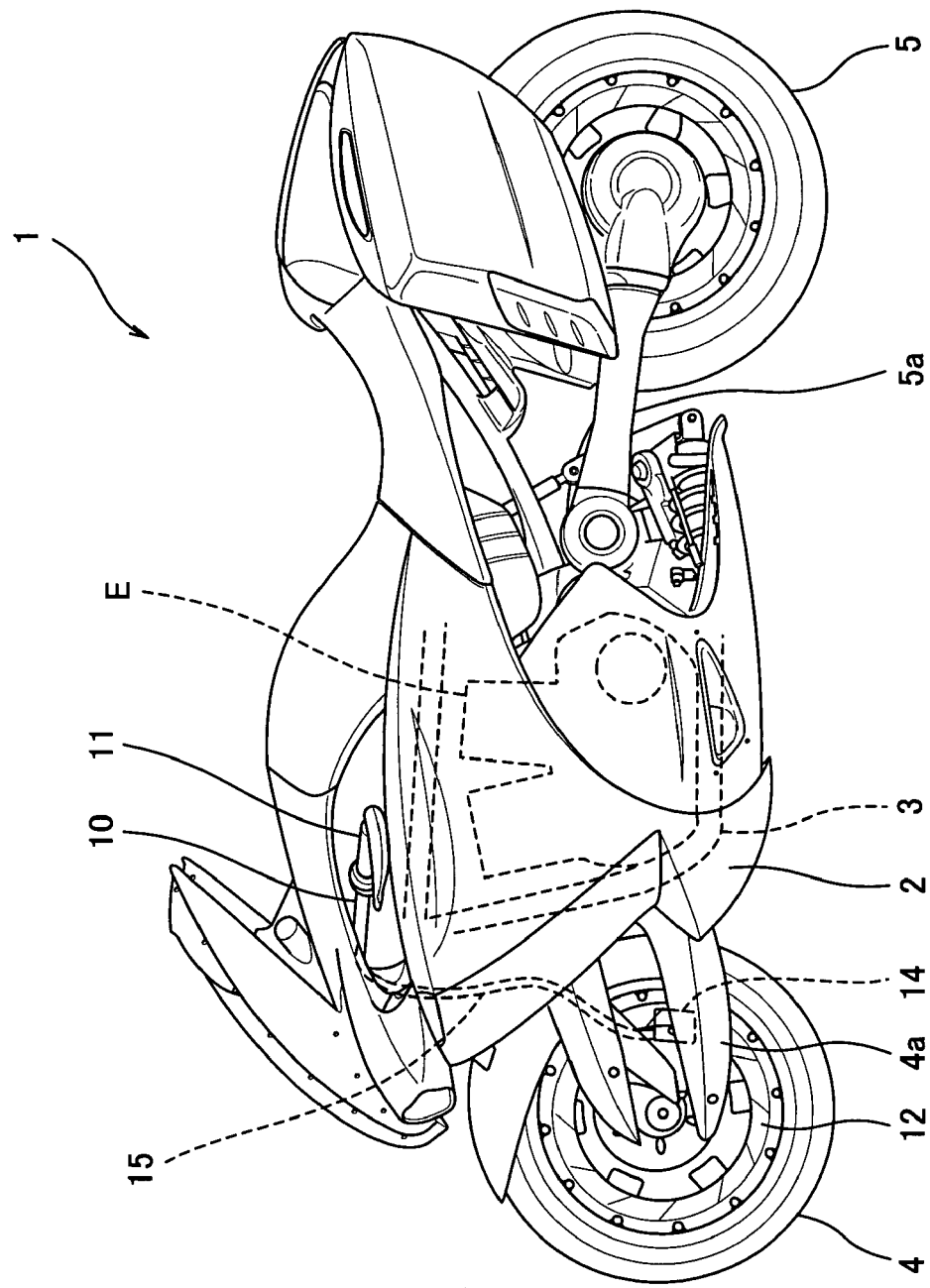
FIG. 1 is a side view of a motorcycle equipped with an oil pressure generator according to an embodiment of the present invention.

Hereinafter, an embodiment of an oil pressure generator according to the present invention will be described with reference to the drawings. FIG. 1 is a side view of a motorcycle 1. Referring now to FIG. 1, the motorcycle 1 is of a sportbike or streetbike type, configured for on-road use. An engine E is mounted within a body frame 3 of the motorcycle 1 covered with a cowling 2. A front wheel 4 which is a steering wheel and a rear wheel 5 which is a drive wheel are mounted forward and rearward relative to the body frame 3, respectively. The front wheel 4 is connected to a bar handle 10 through a front fork 4a. The bar handle 10 is attached to a front portion of the body frame 3 of the motorcycle 1 to extend in a lateral direction of the motorcycle 1. The front fork 4a is pivotally mounted to the body frame 3. When a rider steers the handle 10 to the right or to the left, the front wheel 4 rotates to the right or to the left.

The rear wheel 5 is rotatably mounted at a rear end portion of a swing arm 5a extending in a longitudinal direction of the motorcycle 1. A front end portion of the swing arm 5a is connected to the engine E mounted in the motorcycle 1 to allow the swing arm 5a to be pivotable around the front end portion. A drive shaft (not shown) is housed within the swing arm 5a. An output shaft of the engine E is coupled to the drive shaft through a bevel gear or the like to allow rotation of the engine E to be transmitted to the rear wheel 5 through the drive shaft. As used herein, the term indicating direction means a direction seen from the perspective of the rider riding on the motorcycle 1.

As shown in FIG. 1, a grip 11 is provided at an end portion of the handle 10 and adapted to be gripped by the rider during traveling. As described later, an oil pressure generator 30 (see FIG. 2) is provided in the vicinity of the grip 11. A substantially disc-shaped brake disc 12 is mounted coaxially on the front wheel 4. A brake caliper 14 is mounted on the front fork 4a and configured to seize the brake disc 12 to brake rotation of the front wheel 4. The brake caliper 14 is connected to the oil pressure generator 30 through a hydraulic hose 15.

Figure 2:
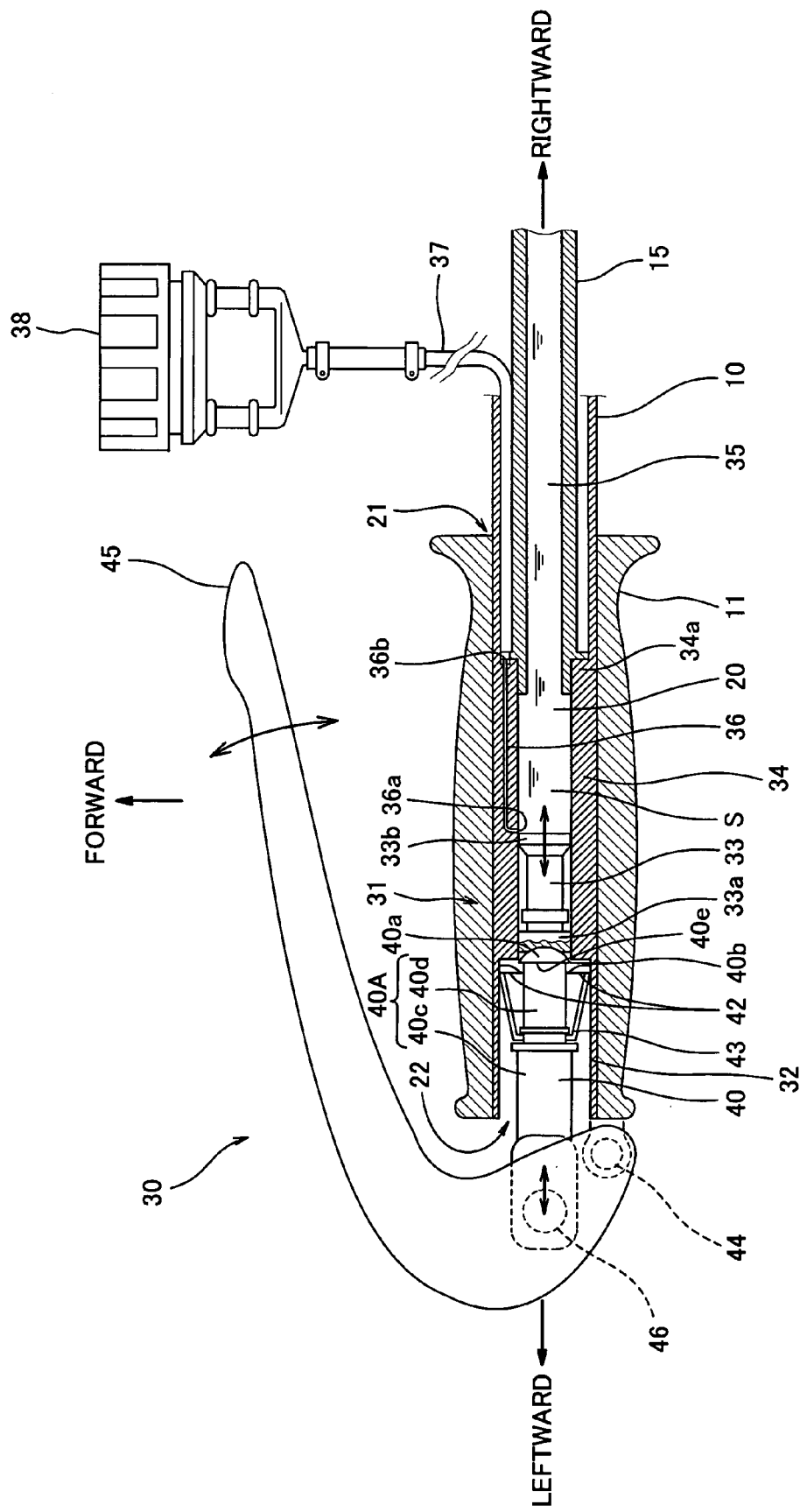
FIG. 2 is a partial cross-sectional view of the oil pressure generator, showing a left grip of the motorcycle in FIG. 1 and its vicinity.

FIG. 2 is a partial cross-sectional view showing the oil pressure generator 30, i.e., a left end portion of the handle 10 of the motorcycle 1 in FIG. 1 and its vicinity. As shown in FIG. 2, the handle 10 has a pipe structure and the grip 11 is substantially tubular. And, the grip 11 has a cylindrical inner space 20 with right and left opening ends 21 and 22 at both ends thereof. The grip 11 is made of synthetic resin having suitable elasticity. A left end portion of the handle 10 is inserted into the inner space 20 from the right opening end 21 toward the left opening end 22 of the grip 11.

A master cylinder 31 is provided within an end portion of the handle 10 where the grip 11 is provided. The master cylinder 31 forms the oil pressure generator 30. The master cylinder 31 includes a tubular cylinder portion 34 configured to slidably house a piston 33 of the oil pressure generator 30, and a tubular rod storage portion 32 configured to house a rod 40 which operates to cause the piston 33 to move. More specifically, the rod storage portion 32 is located within the left end portion of the handle 10, which is inserted into the inner space 20 of the grip 11, and the cylinder portion 34 is located on the right side of the rod storage portion 32. The cylinder portion 34 has an inner diameter smaller than that of the rod storage portion 32.

An outer peripheral surface of a right end portion 33b of the piston 33 is in sealing contact with an inner peripheral surface of the cylinder portion 34. The piston 33 is slidable to the right or to the left along a center axis of the cylinder portion 34. A hydraulic hose 15 extends from the brake caliper 14 (see FIG. 1) into the handle 10. The hydraulic hose 15 is connected to a right end portion 34a of the cylinder portion 34 which is an end portion located inward within the handle 10. Brake oil 35 is filled within the hydraulic hose 15 and within a space S of the cylinder portion 34 which is located on the right side of the piston 33, i.e., inward relative to the piston 33 within the handle 10.

An oil passage 36 is formed in a wall portion of the cylinder portion 34. The oil passage 36 is structured such that one opening end portion 36a opens in the inner space S of the cylinder portion 34 at substantially the center in an axial direction of the cylinder portion 34 and the other opening end portion 36b opens in a right end face of the cylinder portion 34. An oil hose 37 extends from the right opening end portion 36b of the oil passage 36 to a position in the axial direction within the handle 10 through an inside of the handle 10. Further, the oil hose 37 extends outward. A tip end portion of the oil hose 37 is connected to a reservoir tank 38 provided at an appropriate position of the motorcycle 1.

As should be appreciated from the above, the oil passage 36 is formed within the cylinder portion 34 of the master cylinder 31 integrated into the handle 10, and the hydraulic hose 15 and the oil hose 37 are located within the handle 10 in the vicinity of the grip 11, the oil passage 36, the hydraulic hose 15, and the oil hose 37 are not substantially exposed to wind, rain, ultraviolet rays, and the like which could degrade these members. In addition, the handle 10 is simplified, irrespective of the presence of the hydraulic hose 15 and the oil hose 37. While the cylinder portion 34 is formed on an inner surface of the pipe of the handle 10 in FIG. 2, the cylinder portion 34 or other portions may be manufactured separately and thereafter fixed into the handle 10 by an appropriate attachment mechanism.

The rod 40 is mounted to extend within the rod storage portion 32 such that its axial direction conforms to the lateral direction of the motorcycle 1. The rod 40 pushes the piston 33 to cause the piston 33 to move to the right. The rod 40 has a rod portion 40A and a spherical rod contact portion 40a provided on a right end portion of the rod portion 40A and configured to contact the piston 33. A concave piston contact portion 33a is provided on a left end portion of the piston 33 and configured to contact the rod contact portion 40a so as to conform in shape to the rod contact portion 40a. With the rod contact portion 40a in contact with the piston contact portion 33a, the rod 40 is pivotable around the rod contact portion 40a.

The rod contact portion 40a has an outer peripheral portion 40b protruding radially outward from the rod portion 40A. More specifically, the rod portion 40A has a left large diameter portion 40c and a right small diameter portion 40d, and the outer peripheral portion 40b protrudes radially outward from the small diameter portion 40b so as to have a step portion 40e between the outer peripheral portion 40b and an outer periphery of the small diameter portion 40d. A flange-shaped stopper 42 protrudes inward from the inner peripheral surface of the rod storage portion 32 in the vicinity of a right (cylinder portion 31 side) end portion of the rod storage portion 32. The stopper 42 is positioned on a left side of the step portion 42e and configured to contact the step portion 42e of the outer peripheral portion 40b of the rod contact portion 40a to restrict a movable range of the rod 40, thus inhibiting the rod 40 from moving to the left (outward) from a predetermined position.

A rubber boot 43 is provided between the inner peripheral surface of the rod storage portion 32 and the outer peripheral surface of the rod portion 40A of the rod 40 on the left side of the stopper 42. The rubber boot 43 is expandable and compressive, and is formed in a frustoconical shape in an expanded state. The rubber boot 43 serves to seal the cylinder portion 34 to inhibit dust from entering into the cylinder portion 34 from outside. As shown in FIG. 2, since the rubber boot 43 is positioned relatively inward (rightward) within the rod storage portion 32, the rubber boot 43 is not substantially subjected to dust. While the cylinder portion 34 is positioned at substantially the center of the grip 11 in the lateral direction, the position of the cylinder portion 34 may alternatively be shifted to the right, i.e., inward. In that case, since the rod storage portion 32 is extended to the right and hence the position of the rubber boot 43 is shifted to the right, it is possible to inhibit the entry of dust into the cylinder portion 34 more effectively.

A pivot shaft 44 is provided on an end portion (left end portion) of the handle 10. A base end portion of a brake laver 45 operated by the rider is connected to the pivot shaft 44 to allow the lever 45 to be pivotable around the pivot shaft 44. The brake lever 44 is curved and substantially L-shaped. The brake lever 45 extends from the left side of the grip 11 to the right side of the grip 11 through the front side of the grip 11. The brake lever 45 is pivotally attached to a pivot shaft 46 provided on the left portion of the rod 40 in the vicinity of a curved portion of the lever 45. In this structure, when the brake lever 45 pivots, the rod 40 reciprocates substantially to the right or to the left.

Figure 3:
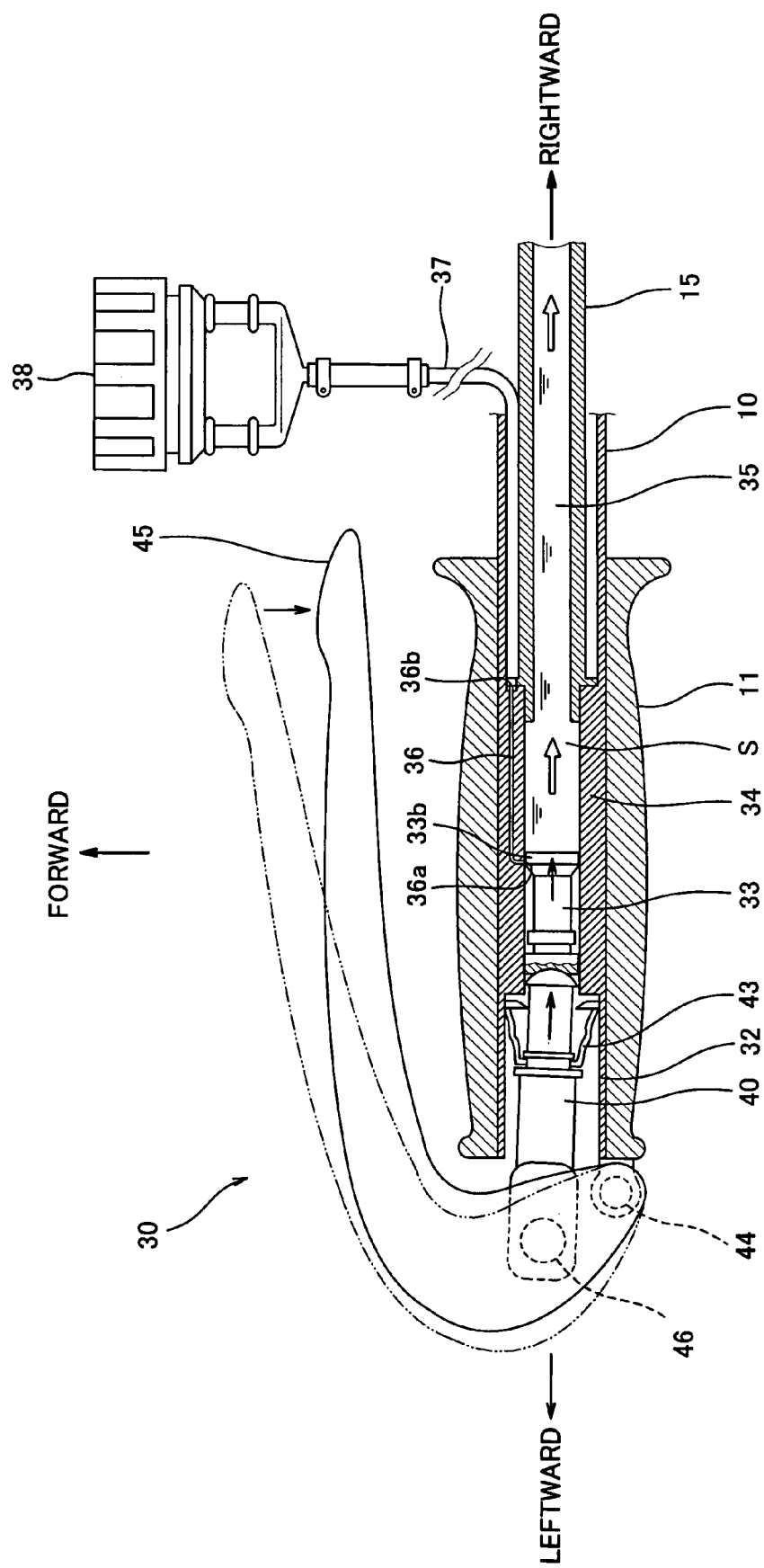
FIG. 3 is a view showing an operation of the oil pressure generator in FIG. 2.

When the rider grips the brake lever 45 in a released state (FIG. 2), the brake lever 45 pivots around the pivot shaft 44 of the handle 10 as shown in FIG. 3, thereby causing the rod 40 to be pushed to move to the right (inward). The rod 40 pushes the piston 33 to cause the piston 33 to move to the right. The moved piston 33 closes the one end portion 36a of the oil passage 36 that opens in the inner peripheral wall of the cylinder portion 34 to cause brake oil 35 within the cylinder portion 34 to be pressurized. The resulting pressure of the brake oil 35 is transmitted to the caliper 14 (FIG. 1) through the hydraulic hose 15. Thereby, the caliper 14 moves to seize the brake disc 12. In this manner, the front wheel 4 is braked.

In accordance with the oil pressure generator 30 of the motorcycle 1 constructed as described above, the master cylinder 31 can be made highly durable and inhibit dust from entering the cylinder portion 34. In addition, since the rod storage portion 32 and the cylinder portion 34 are integrated into the handle 10, reduction of the number of parts, reduction of the weight of the oil pressure generator 30, and improvement in the external appearance of the vehicle can be achieved.

The oil pressure generator 30 of this embodiment is applied to the brake device configured to cause the caliper 14 to move, it may alternatively be configured to cause a hydraulic clutch to operate. In the case of the engine E equipped with the hydraulic clutch, the clutch and the oil pressure generator 30 may be connected to each other through a hydraulic hose. In that case, by operating a clutch lever (not shown), connection and disconnection between a clutch disc and a clutch plate are accomplished. In such a construction, entry of dust or the like can be inhibited as described above. It will be appreciated that the above-described hydraulic clutch and hydraulic brake may be collectively referred to as hydraulically powered motorcycle components.

As this invention may be embodied in several forms without departing from the spirit of essential characteristics thereof, the above embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An oil pressure generator for a motorcycle, comprising:
   a bar-shaped steering handle having a pipe structure;
   a lever pivotally mounted at one end portion thereof to be pivotable around a pivot attached at an end portion of the handle; and
   a master cylinder for a hydraulically powered motorcycle component, the master cylinder being configured to house a piston movable according to an operation to swing the lever around the pivot, wherein
   the end portion of the handle is inserted into a substantially tabular grip configured to be gripped by a rider, and the master cylinder is located within a portion of the handle which is located within the grip.

2. The oil pressure generator for a motorcycle according to claim 1, wherein the lever is configured to extend forward from the pivot toward a center position in the longitudinal direction of the handle.

3. The oil pressure generator for a motorcycle according to claim 2, wherein the master cylinder is tubular and integrated into the handle.

4. The oil pressure generator for a motorcycle according to claim 3, further comprising:
   a rod, one end portion of which is attached to the lever to allow the rod to be pivotable around the one end portion, and an opposite end portion of which is configured to contact the piston,
   wherein the master cylinder includes a tubular cylinder portion that houses the piston, and a tubular rod storage portion located closer to the end portion of the handle than the cylinder portion and which is configured to house the rod.

5. The oil pressure generator for a motorcycle according to claim 4, wherein a seal member is provided between an outer peripheral surface of die rod and an inner peripheral surface of the rod storage portion and configured to seal the cylinder portion.

6. The oil pressure generator for a motorcycle according to claim 1, further comprising:
   a hydraulic hose configured to connect the hydraulic brake or the hydraulic clutch to the cylinder portion of the master cylinder, the hydraulic hose being filled with oil,
   wherein the hydraulic hose extends through an inside of the handle.

7. The oil pressure generator for a motorcycle according to claim 1, further comprising:
   a reservoir tank that is located to be distant from the master cylinder and is configured to store oil; and
   an oil hose configured to connect the reservoir tank to the master cylinder, wherein the oil hose extends through an inside of the handle.

8. The oil pressure generator for a motorcycle according to claim 1, wherein the hydraulically powered motorcycle component is a hydraulic brake.

9. The oil pressure generator for a motorcycle according to claim 1, wherein the hydraulically powered motorcycle component is a hydraulic clutch.

10. An oil pressure generator for a motorcycle, comprising:
- a bar-shaped steering handle having a pipe structure;
- a lever pivotally mounted in the vicinity of an end portion of the handle; and
- a tubular master cylinder for a hydraulically powered motorcycle component, the master cylinder being configured to house a piston movable according to an operation of the lever, wherein
- the end portion of the handle is inserted into a substantially tubular grip configured to be gripped by a rider, the master cylinder is located within a portion of the handle which is located within the grip, and the master cylinder is integrated into the handle, the oil pressure generator further comprising:
- a rod, one end portion of which is attached to the lever to allow the rod to be pivotable round the one end portion, and an opposite end portion of which is configured to contact the piston,
- wherein the master cylinder includes a tubular cylinder portion that houses the piston, and a tubular rod storage portion located closer to the end portion of the handle than the cylinder portion and which is configured to house the rod.

11. The oil pressure generator for a motorcycle according to claim 10, wherein a seal member is provided between an outer peripheral surface of the rod and an inner peripheral surface of the rod storage portion and configured to seal the cylinder portion.

* * * * *